United States Patent [19]

Grabowski et al.

[11] Patent Number: 5,791,005
[45] Date of Patent: Aug. 11, 1998

[54] SCARIFYING AND DEBURRING TOOL

[75] Inventors: Mark Grabowski, Willoughby; Heinz Holzhaeusser, Concord; Paul M. Miller, Highland Heights; David J. Swift, Webster, all of Ohio

[73] Assignee: The Mill-Rose Company, Mentor, Ohio

[21] Appl. No.: 749,088

[22] Filed: Nov. 14, 1996

[51] Int. Cl.$^6$ ................... B08B 9/00; A46B 5/02
[52] U.S. Cl. ................ 15/104.04; 15/104.05; 15/111
[58] Field of Search ............ 15/106, 111, 160, 15/104.03, 104.05; 7/100, 157; 451/462, 525, 555, 558

[56] References Cited

U.S. PATENT DOCUMENTS

| | | | |
|---|---|---|---|
| 4,014,063 | 3/1977 | Bunke | 15/106 |
| 4,038,715 | 8/1977 | Litt . | |
| 4,133,070 | 1/1979 | Litt . | |
| 4,899,409 | 2/1990 | Cox | 15/111 |
| 5,307,534 | 5/1994 | Miller | 15/104.04 |
| 5,566,416 | 10/1996 | Karls | 15/106 |

OTHER PUBLICATIONS

Three (3) page brochure for "Huntsman Polypropylene," published by Huntsman Polypropylene Corporation, publication date Jun., 1989.

Three (3) pages of product specification brochure for "Standard Insert® Threaded Inserts For Plastics," published by Standard Insert, publication date unknown.

One (1) page product specification chart entitled "Dodge Designer's® Tech-Chart" for Ultra II Post Molded Screw Thread Inserts, published by HeliCoil, published date unknown.

Primary Examiner—Terrence Till
Attorney, Agent, or Firm—Watts, Hoffman, Fisher & Heinke, L.P.A.

[57] ABSTRACT

A scarifying and deburring tool is disclosed adapted to scarify an outer surface of a tubing, pipe or fitting end and scarify and debur an inner surface of a member having an open cylindrical end such tubing, pipe or fitting end. The tool includes an elongated contoured handle with two inner surface scarifying brushes extending from opposite ends of the handle. The handle includes two outer surface scarifying brushes supported in spaced apart throughbores in the handle. A deburring plate is affixed to one side of the handle and includes an inwardly angled deburring scrapers aligned with and extending into respective throughbores. When a tubing, pipe or fitting end is inserted in a throughbore and seated against the corresponding scraper, the end is deburred when the tubing, pipe or fitting is rotated with respect to the tool. The deburring plate includes an opening that functions as a key for opening and closing "B" type acetylene tanks.

13 Claims, 4 Drawing Sheets

SCARIFYING AND DEBURRING TOOL

FIELD OF THE INVENTION

The present invention relates to a hand held scarifying and deburring tool for preparing an end portion of a cylindrically shaped member such as a section of tubing, pipe or a fitting for soldering, brazing, welding or the like and, more particularly, to a scarifying and deburring tool suitable for scarifying inner and outer surfaces of end portions of cylindrically shaped members and deburring inner surfaces of end portions of cylindrically shaped members.

BACKGROUND OF THE INVENTION

Scarifying tools for scarifying ends of pipes are disclosed in U.S. Pat. No. 4,038,715 to Litt which issued on Aug. 2, 1977 and U.S. Pat. No. 4,133,070 to Litt which issued on Jan. 9, 1979, both of which are assigned to the assignee of the present invention. U.S. Pat. Nos. 4,038,715 and 4,133,070 are incorporated herein in their respective entireties by reference. The scarifying tools include a handle supporting four scarifying brushes. The scarifying brushes included two different sized wire brushes for scarifying an inner surface of an end portion of cylindrically shaped member and two different sized, open centered cylindrically shaped scarifying brushes for scarifying an outer surface of an end portion of cylindrically shaped member.

When a section of tubing or pipe is cut off from a length of tubing or pipe is machined, extruded, molded or otherwise formed and cut off from a section of hex or round bar stock or tubing, a burr will often be formed on an inner surface of the tubing or pipe end. It is desirable to remove such a burr prior to soldering, brazing or welding the tubing, pipe or fitting end. What is needed is a multipurpose scarifying and deburring tool which includes a deburring scraper to debur an inner surface of an end portion of a cylindrically shaped member such as a section of tubing or pipe prior to soldering or welding. What is also needed is a scarifying and deburring tool having the deburring scraper aligned with an open centered, cylindrically shaped scarifying brush so that the deburring operation is performed in close proximity to the outer surface scarifying operation to minimize the total time of the scarifying and deburring operations.

An acetylene tank is used to provide a source of acetylene in acetylene welding operations. Typically, a "B" type acetylene tank includes a valve having a valve stem terminating in a square shaped end. A key having a matching square shaped opening is needed to open and close such "B" type acetylene tank valves. A small tank key is prone to being misplaced or lost by a welder working at a job site. What is needed is a multipurpose scarifying and deburring tool which also includes a key for opening and closing "B" type acetylene tanks.

SUMMARY OF THE INVENTION

A hand held scarifying and deburring tool is disclosed for scarifying and deburring an end portion of a cylindrically shaped member with an open center region such as a section of tubing, pipe or a fitting. The scarifying and deburring tool includes an elongated contoured handle supporting four scarifying brushes: two brushes for scarifying inner cylindrical surfaces of fitting ends and two open centered, cylindrically shaped brushes for scarifying outer cylindrical surfaces of a tubing or pipe end. The two brushes for scarifying inner cylindrical surfaces will be referred to as "inner surface scarifying brushes" while the two open centered, cylindrically shaped brushes for scarifying outer cylindrical surfaces will be referred to as "outer surface scarifying brushes".

The handle includes a first handle piece and a second handle piece held together with two screws. The inner surface scarifying brushes extend from opposite ends of the handle and are cylindrical in shape. A first inner surface scarifying brush is sized for scarifying objects or members having ½ inch inner diameter (ID) end portions such as fitting ends. A second inner surface scarifying brush is sized for scarifying objects or members having ¾ inch ID end portions such as fitting ends. The appropriate sized inner surface scarifying brush is inserted into a fitting end and the handle is rotated about the tool's longitudinal axis thereby scarifying the inner surface of the fitting end so as to prepare it for welding, soldering, brazing, etc.

The tool's two outer surface scarifying brushes comprise first and second brushes sized to fit in first and second spaced apart throughbores in the handle. The throughbores are defined by cylinders of the first handle piece extending through the handle interior. Each of the outer surface scarifying brushes are comprised of a rectangular strip of backing material having short wire bristles extending from one side to form an abrasive surface. A first outer surface scarifying brush includes a backing strip of a length such that it forms a cylinder with an open center region when inserted in the first throughbore. Its bristles extend radially inwardly forming the abrasive surface for scarifying an object or member having a cylindrical end portion of ⅝ inch outer diameter (OD) such as a tubing or pipe end. A ⅝ inch OD tubing or pipe end is inserted in the first throughbore and rotated with respect to the tool thereby scarifying the outer surface of the tubing or pipe end so as to prepare it for welding, soldering, brazing, etc.

A second outer surface scarifying brush includes a backing strip of a length such that it forms a cylinder with an open center region when inserted in the second throughbore. Its bristles extend radially inwardly forming an abrasive surface to scarify an object or member such as tubing or pipe end having outer cylindrical surface of ⅞ inch OD. The tubing or pipe end is inserted in the second throughbore and rotated with respect to the tool thereby scarifying the outer surface of the tubing or pipe end.

Sandwiched between a radially outwardly facing surface of the first outer surface scarifying brush strip and the first cylinder defining the first throughbore is a first strip of elastomeric material. The elastomeric strip forms a cylinder when inserted in the first throughbore and functions to prevent relative rotation between the scarifying brush and the tool handle when a member to be scarified is inserted in the first throughbore and rotated. The elastomeric strip also normally biases the bristles of the first scarifying brush radially inwardly such that the bristles firmly and uniformly engage an outer surface of the member to be scarified. At the same time, however, since the elastomeric strip is compressible, the strip "gives" to permit slight radial outward movement of the scarifying brush to permit easy insertion of the member into the first throughbore.

Sandwiched between an outwardly facing surface of the second outer surface scarifying brush backing strip and the second cylinder defining the second throughbore is a second strip of elastomeric material which functions in a manner identical to the first elastomeric strip described above.

The scarifying and deburring tool of the present invention also includes a plate affixed to a front or first side or surface of the handle. The plate includes first and second deburring scrapers and a square opening which functions as a "B" type acetylene tank valve key. The first and second deburring scrapers are formed by spaced apart sections of the plate which have been bent so as to be substantially perpendicular to the surrounding region of the plate. The first and second scrapers extend into the first and second throughbores respectively.

A width of the first deburring scraper is sized to debur an inner surface of a ½ inch ID member such as a tubing or pipe end. Assuming the member has a wall thickness of ⅛ inch, then an end portion of the member inserted into the first throughbore from a side of the throughbore opposite the plate and rotated will have its outer surface scarified. If the end portion is pushed further into the first throughbore such that it is seated against the first deburring scraper and the member is rotated, its inner surface will be deburred simultaneously with a portion of its outer surface being scarified.

A width of the second scraper is sized to debur an inner surface of a ¾ inch ID member inserted into the second throughbore from a side of the throughbore opposite the plate and rotated will have its outer surface scarified. If the end portion is pushed further into the second throughbore such that it is seated against the second deburring scraper and the member is rotated, its inner surface will be deburred simultaneously with a portion of its outer surface being scarified.

By appropriately changing the inner and outer surface scarifying brushes and the width of the first and second deburring scrapers, the scarifying tool of the present invention may also be configured to scarify the inner and outer surfaces and deburring the inner surfaces of tubing, pipe or fitting ends from ¼ inch ID (⅜ inch OD, assuming a wall thickness of the tubing, pipe or fitting end of ⅛ inch) to ¾ inch ID (⅞ inch OD, assuming a wall thickness of the tubing, pipe or fitting end of ⅛ inch). The scarifying tool can also be configured for scarifying and deburring corresponding metric sizes of tubing, pipe or fitting ends.

These and other advantages and features of this invention will be clearly understood through consideration of the following detailed description of the invention in conjunction with the accompanying drawings.

DETAILED DESCRIPTION

Figure 1:
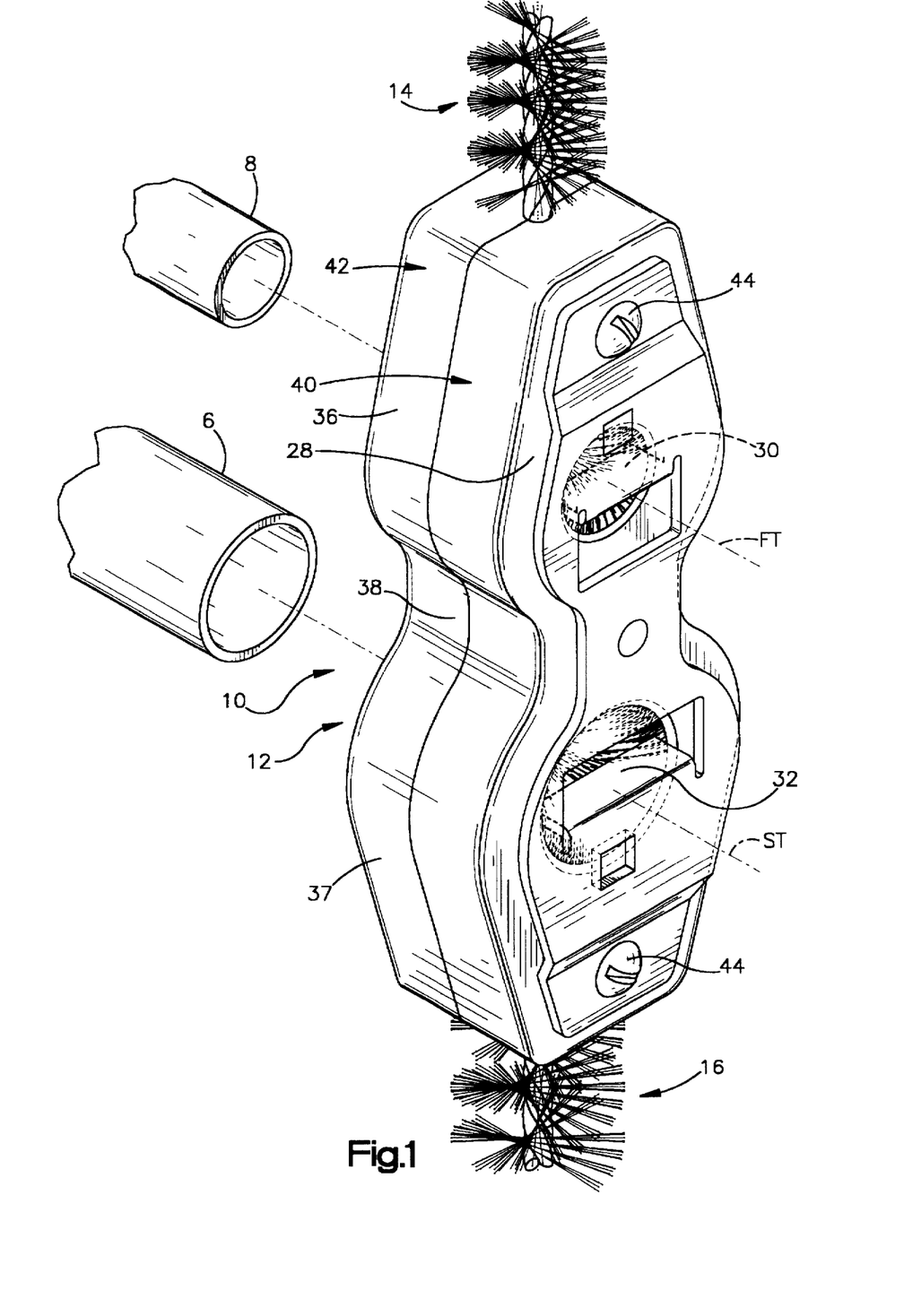
FIG. 1 is a perspective view of the multiple purpose scarifying and deburring tool of the present invention.
Figure 2:
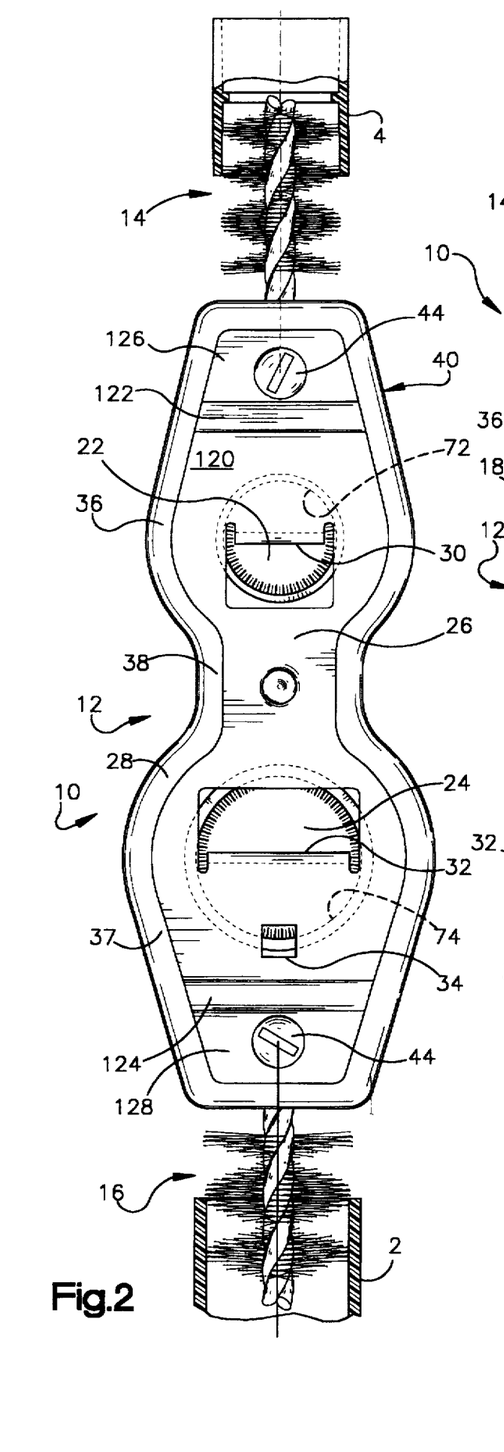
FIG. 2 is a front elevation view of the scarifying and deburring tool of FIG. 1.

A multiple purpose hand held scarifying and deburring tool of the present invention is shown generally at 10 in FIGS. 1–5. The tool 10 functions to scarify outer and inner surfaces of end portions of cylindrically shaped members having a central opening such as sections of tubing, pipes and fittings. An end portion of a section of ⅝ inch OD (½ inch ID, assuming a wall thickness ⅛ inch) tubing is shown in FIG. 1 at 8 while an end portion of a section of ⅞ inch OD (¾ inch ID, assuming a wall thickness of ⅛ inch) tubing is shown at 6. An end portion of a fitting having a ½ inch ID is shown in FIG. 2 at 4, while an end portion of ¾ inch ID fitting is shown at 2. The tool 10 also deburs inner surfaces of end portions of cylindrically shaped members. Although the tool 10 will be described with respect to scarifying brushes and deburring scrapers sized to scarifying and debur end portions of ½ inch ID (⅝ inch OD) and ¾ inch ID (⅞ inch OD) tubing and ½ inch ID and ¾ inch ID fittings, it should be appreciated that the tool 10 of the present invention may modified and fabricated to support different sized brushes and scrapers as required.

The scarifying and deburring tool 10 includes an elongated handle 12, first and second inner surface scarifying brushes 14, 16 supported at opposite ends of the handle, first and second outer surface scarifying brushes 18, 20 supported in first and second throughbores 22, 24 in the handle and a plate 26 affixed to a front or first side 28 of the handle. The first and second throughbores 22, 24 extend through an interior region of the handle 12. The first inner surface scarifying brush 14 is suitable for scarifying an inner surface of an end portion of a cylindrically shaped member having a ½ inch ID, e.g., the ½ inch ID fitting end portion 4, while the second inner surface scarifying brush 16 is suitable for scarifying an inner surface of an end portion of a cylindrically shaped member having a ¾ inch ID, e.g., an end the ¾ inch ID fitting end portion 2.

The first outer surface scarifying brush 18 is suitable for scarifying an outer surface of an end portion of a cylindrically shaped member having a ⅝ inch OD, e.g., the ½ inch ID (⅝ inch OD) tubing end portion 8, while the second outer surface scarifying brush 20 is suitable for scarifying an outer surface of an end portion of a cylindrically shaped member having a ⅞ inch OD, e.g., the ¾ inch ID (⅞ inch OD) tubing end portion 6.

The plate 26 is preferably fabricated of 0.048 inch thick (0.018 gauge) stainless steel and includes first and second deburring scrapers 30, 32. The first and second deburring scrapers 30, 32 are aligned with a respective first and second outer surface scarifying brushes 18, 20. The first scraper 30 is aligned with and extends slightly into the first throughbore 22 and is sized to debur an inner surface of the end portion 8 of the ½ inch ID (⅝ inch OD) tubing while the second scraper 32 is aligned with and extends slightly into the second throughbore 24 and is sized to debur an inner surface of the end portion 6 of the ¾ inch ID (⅞ inch OD) tubing.

The ½ inch ID (⅝ inch OD) tubing end portion 8 is inserted into the first throughbore 22 from a back or second side 33 (FIG. 3) of the handle 12, along the throughbore axis labeled FT in FIG. 1, and is rotated with respect to the tool 10 to scarify its outer surface. To debur the tubing end portion 8, the tubing is pushed further into the throughbore 22 such that it is seated against the first deburring scraper 30 and a distal portion of the scraper extends into the tubing end portion. The tubing is then rotated while pressure is applied longitudinally along the axis FT to keep the tubing end portion 8 seated against the first deburring scraper 30 causing the end portion to have its inner surface deburred simultaneously with having a portion of its outer surface scarified by the first outer surface scarifying brush 18. This process can easily be accomplished by one person by grasping the handle 12 in one hand and the tubing 8 in the other hand.

Similarly, the ⅛ inch OD (¾ inch ID) tubing end portion 6 is inserted into the second throughbore 24 from the back side 33 of the handle 12, along the second throughbore axis labeled ST in FIG. 1, and is rotated with respect to the tool 10 to scarify its outer surface. To debur the tubing end portion 6, the tubing is pushed further into the throughbore 34 such that it is seated against the second deburring scraper 32 and a distal portion of the scraper extends into the tubing end portion. The tubing is then rotated while pressure is applied longitudinally along the axis ST to keep the tubing end portion 6 seated against the second deburring scraper 32 causing the end portion to have its inner surface deburred simultaneously with having a portion of its outer surface scarified by the second outer surface scarifying brush 20.

Figure 3:
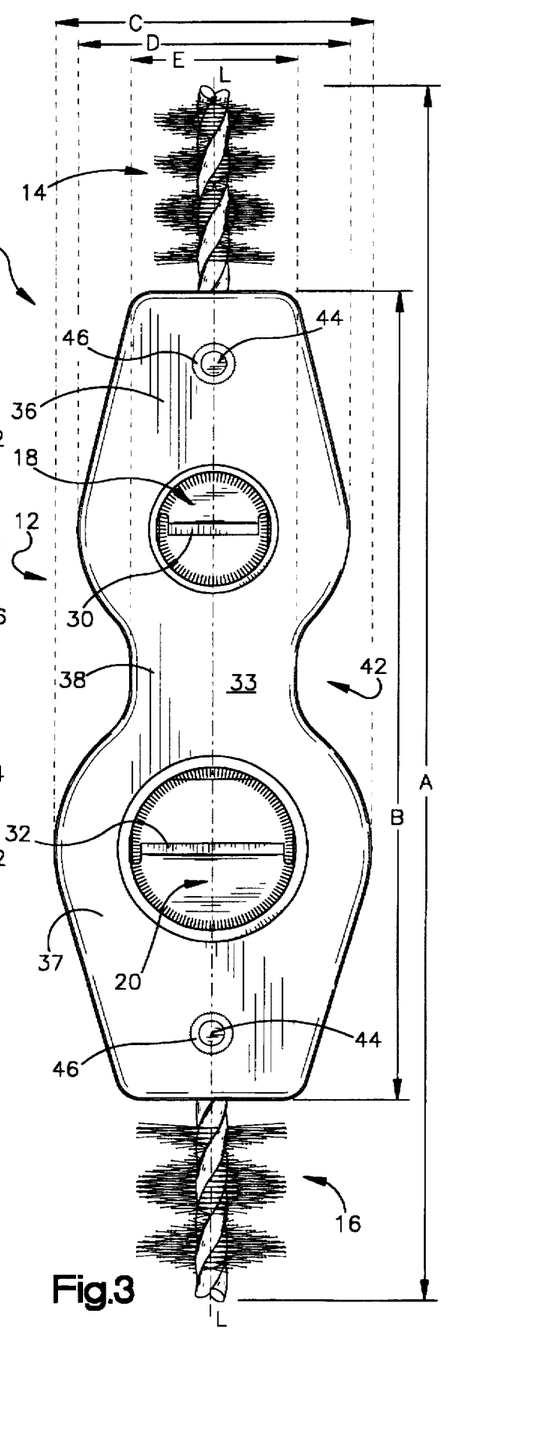
FIG. 3 is a back elevation view of the scarifying and deburring tool of FIG. 1.
Figure 4:
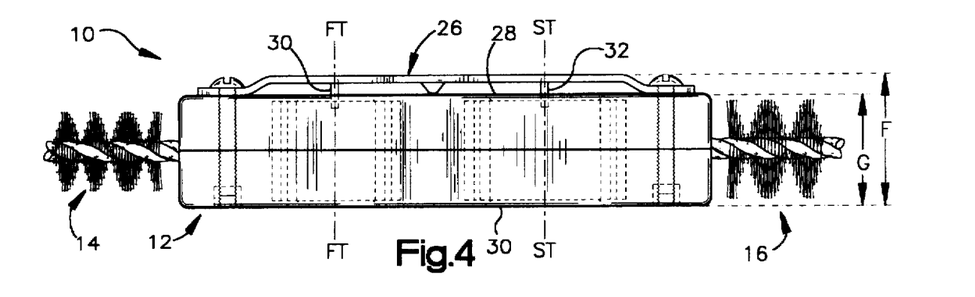
FIG. 4 is a side elevation view of the scarifying and deburring tool of FIG. 1.

The plate 26 further includes a square opening 34 which functions as a valve key for square ended valve stem of a "B" type acetylene tank. The square opening 34 is approximately 0.190 inch on each side. As can be seen in FIGS. 1 and 4 the central longitudinal axis FT of the first throughbore 22 is parallel to the central longitudinal axis ST of the second throughbore 24. The handle 12 is contoured along a longitudinal axis L—L (FIGS. 2 and 3) to form a comfortable gripping shape. The longitudinal axis L—L is perpendicular to throughbore axis FT and ST. The handle 12 includes an upper portion 36 and a slightly larger lower portion 37 connected by a narrower central waist 38. Approximate dimensions of the scarifying and deburring tool 10 are as follows:

| Description | Label | Approximate Dimension |
| --- | --- | --- |
| Overall length of tool | A (FIG. 3) | 7.500 inches |
| Length of tool handle | B (FIG. 3) | 5.063 inches |
| Width (lower portion) | C (FIG. 3) | 1.750 inches |
| Width (top portion) | D (FIG. 3) | 1.531 inches |
| Width (central waist) | E (FIG. 3) | 0.938 inch |
| Overall thickness (including plate) | F (FIG. 4) | 1.188 inches |
| Thickness of handle | G (FIG. 4) | 1.000 inch |

Figure 5:
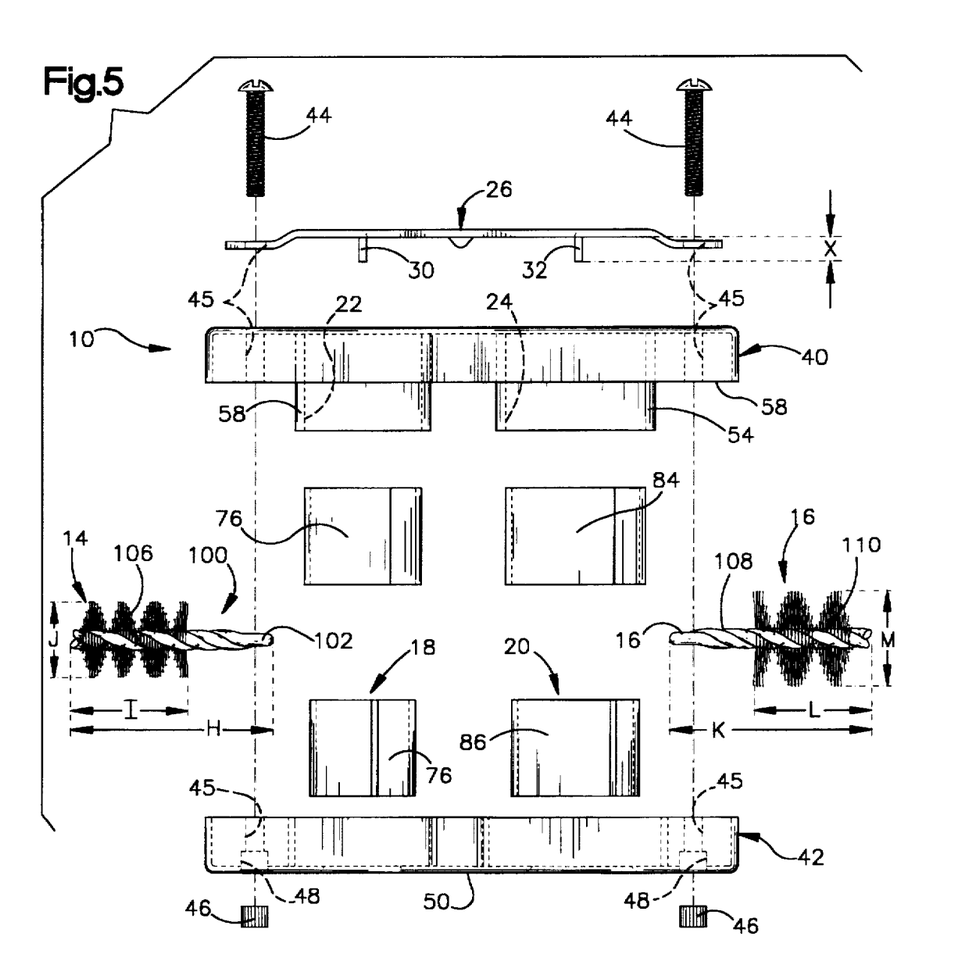
FIG. 5 is an exploded side elevation view of the scarifying and deburring tool of FIG. 1.
Figures 6, 7:
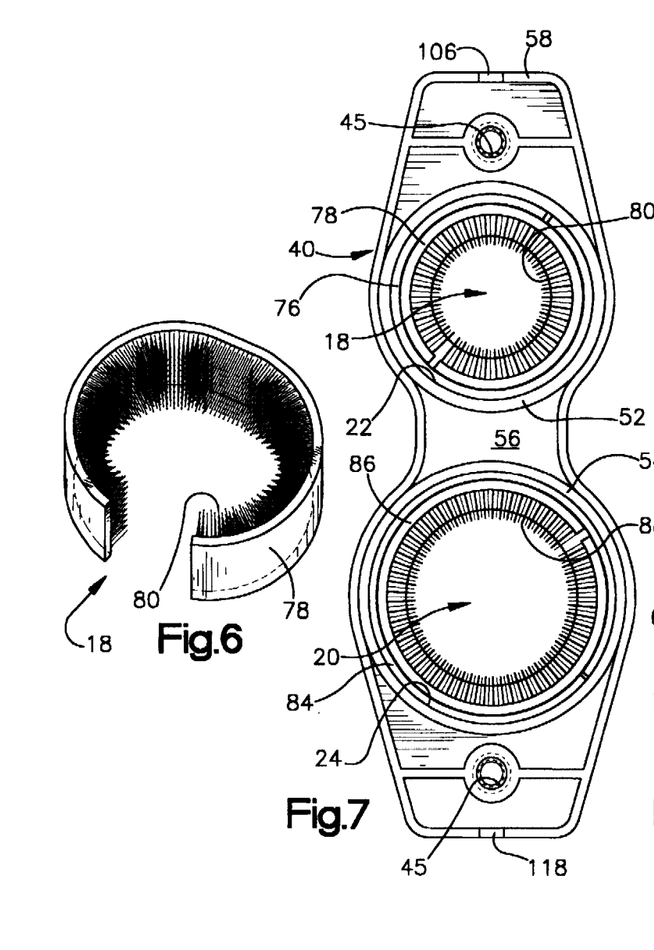
FIG. 6 is a perspective view of one of two outer surface scarifying brushes of the scarifying and deburring tool of FIG. 1.
FIG. 7 is back elevation view of a first handle piece of the scarifying and deburring tool of FIG. 1 with a plate attached to a front surface of the first handle piece removed.
Figure 8:
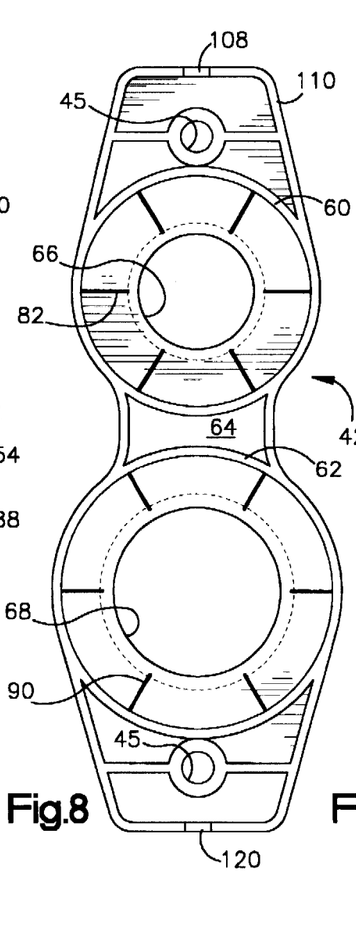
FIG. 8 is a front elevation view of a second handle piece of the scarifying and deburring tool of FIG. 1.

As can best be seen in FIG. 5, the handle 12 is comprised of mating first and second pieces 40, 42 preferably made by injection molding of polypropylene. The first handle piece 40 is shown in FIG. 7 while the second handle piece 42 is shown in FIG. 8. The first and second handle pieces 40, 42 are held together by a pair of screws 44 which extend through aligned apertures 45 in the plate 26, the first handle piece 40 and the second handle piece 42. The screws 44 are 10–24×1.000 inch in length plated round head machine screws. Distal ends of the screws 44 thread into respective cylindrical inserts 46. The inserts 46 have 10–24 size threaded central holes and are knurled on their outer surfaces so as to prevent their rotation within respective openings 48 (seen in dashed line in FIG. 5) in the second handle piece 42. The inserts 46 are press fit into their respective openings 48 and have an interference fit with the second handle piece 42. The openings 48 in the second handle piece 42 are deep enough such that ends of the inserts 46 are flush with an outer surface 50 of the second handle piece 42 when the handle 12 is assembled. A suitable insert is Part No. 6035 sold by Spirol International Corporation of Danielson, Conn. 06239.

As can best be seen in FIGS. 5 and 7, the first handle piece 40 includes first and second cylinders 52, 54 which define the throughbores 22, 24. The first and second cylinders 52, 54 extend from an inner surface 56 (FIG. 7) of the first handle piece 40 approximately 0.375 inch beyond a peripheral edge 58 of the first handle piece. The first cylinder 52 has an inner diameter of approximately 1.219 inches, while the second cylinder 54 has a diameter of approximately 1.50 inches. When the handle 12 is assembled, portions of the first and second cylinders 52, 54 extending beyond the first handle piece peripheral edge 58 fit into respective first and second cylindrical bosses 60, 62 (FIG. 8) extending from an inner surface 64 of the second handle piece 42. Distal edges of the first and second cylinders 52, 54 abut the inner surface 64 of the second handle piece 42 when the handle 12 is assembled.

Centered in the first and second cylindrical bosses 60, 62 are first and second openings 66, 68 in the second handle piece. The first opening 66 is approximately 0.625 inch in diameter to receive the end portion of the ½ inch ID tubing 8, while the second opening 68 is approximately 0.938 inches in diameter to receive the end portion of the ¾ inch ID tubing 6. As can be seen in FIG. 3, each of the first and second openings 66, 68 is tapered from larger sized openings in an outer surface 70 of the second handle piece 42 to smaller sized openings in the inner surface 64 of the size recited above. Similarly, when the handle 12 is assembled, first and second openings 72, 74 in the first handle piece 40 are aligned with the first and second openings 66, 68 in the second handle piece 42 and are the same size, that is, the first openings 66, 72 are concentric with respect to axis FT while the second openings 68, 74 are concentric with respect to axis ST.

Positioned in the first throughbore 22 is the first outer surface scarifying brush 18 and a first elastomeric strip 76. The first elastomeric strip 76 is 0.062 inch thick and ¾ inch wide and is preferably made of gum rubber and provides a very high coefficient of friction to prevent relative rotation between the first outer surface scarifying brush 18 and the first cylinder 52 defining the first throughbore 22 and also is compressible, that is, it compresses or "gives" to permit slight radial outward movement of the first outer surface scarifying brush 18 to permit easy insertion of the end portion of the tubing 8 into the first throughbore 22. As can be seen in FIG. 6, the first outer scarifying brush 18 comprises a flexible backing strip 78 from which high carbon plated steel wire bristles 80 extend approximately 0.188 inch in one direction. Each bristle has a diameter of approximately 0.008 inches. The flexible backing strip 78 preferably is made from polyurethane, although other materials such as cardboard, canvas and rubber like material would also be suitable.

The flexible backing strip 78 is approximately 3.063 inches in length and 0.750 inch in width while the first elastomeric strip 76 is approximately 3.500 inches in length and 0.750 inch in width. During assembly of the handle 12, the first elastomeric strip 76 is curved into a cylindrical shape and inserted into the first cylinder 52. Upon release, the first elastomeric strip 76 forms a cylindrical shape within the first cylinder 52 as seen in FIG. 7.

Similarly, the first outer surface scarifying brush 18 is curved into cylindrical shape, the bristles 80 facing radially inwardly, and is inserted into the cylindrical shape formed by the first elastomeric strip 76. Upon release, the first outer surface scarifying brush 18 forms a substantially cylindrical shape within the first elastomeric strip 76. The bristles 80 of the first outer scarifying brush 18 face inwardly forming an abrasive surface surrounding an open central region. A diameter of the abrasive surface of the first scarifying brush 18, that is, a distance between distal tips of bristles 180 degrees apart, is approximately 0.531 inch.

The inner surface 56 of the first handle piece 40 within the first cylinder 52 includes six uniformly spaced apart slightly raised radial portions (not shown) and the inner surface 64 of the second handle piece 42 includes six uniformly spaced apart slightly raised radial portions 82 (FIG. 8) which abut side edges of the first elastomeric strip 76 and the first outer surface scarifying brush backing strip 78 to further inhibit rotation of the first outer surface scarifying brush 18 with respect to the handle 12.

Positioned in the second throughbore 24 is the second outer surface scarifying brush 20 and a second elastomeric strip 84 similar to the first elastomeric strip 76 in composition and width but having a length of 4.313 inches in length. The second outer scarifying brush 20 comprises a flexible backing strip 86, like the flexible backing strip 78, from which high carbon plated steel wire bristles 88 extend, like the wire bristles 80.

The flexible backing strip 78 is approximately 3.813 inches in length and 0.750 inch in width. During assembly of the handle 12, the second elastomeric strip 84 is curved into a cylindrical shape and inserted into the second cylinder 54. Upon release, the second elastomeric strip 84 forms a cylindrical shape within the second cylinder 54 as seen in FIG. 7. Similarly, the second outer surface scarifying brush 20 is curved into cylindrical shape, the bristles 88 facing radially inwardly, and is inserted into the cylindrical shape formed by the second elastomeric strip 84. Upon release, the second outer surface scarifying brush 20 forms a substantially cylindrical shape within the second elastomeric strip 84. The bristles 88 of the second outer scarifying brush 18 face radially inwardly forming an abrasive surface surrounding an open central region. A diameter of the abrasive surface of the first scarifying brush 18, that is, a distance between distal tips of bristles 180 degrees apart, is approximately 0.813 inch.

The inner surface 56 of the first handle piece 40 within the first cylinder 52 includes six uniformly spaced apart slightly raised radial portions (not shown) and the inner surface 64 of the second handle piece 42 includes six uniformly spaced apart slightly raised radial portions 90 (FIG. 8) which abut side edges of the second elastomeric strip 84 and the second outer surface scarifying brush backing strip 86 to further inhibit rotation of the second outer surface scarifying brush 20 with respect to the handle 12.

The first inner surface scarifying brush 14 and the second inner surface scarifying brush 16 are aligned with the longitudinal axis L—L of the tool 10. The first inner surface scarifying brush 14 comprises a length of 0.091 inch thick (13 gauge) galvanized steel wire 100. A center portion 102 of the wire 100 forms a loop through which a threaded body of one of the screws 44 is inserted while the remainder of the wire forms a twisted wire spine 104. High carbon steel crimped wire bristles 106 which are 0.006 inches thick are held in a distal bristle portion of the twisted wire spine 104. The twisted wire spine 104 extends through a circular opening in an end of the handle 12 formed by a semicircular opening 106 (FIG. 7) in the peripheral edge 58 of the first handle piece 40 and a matching semicircular opening 108 (FIG. 8) in a peripheral edge 110 of the second handle piece 42. Suitable dimensions for the first inner surface scarifying brush 14 are as follows:

| Description | Label | Dimension |
| --- | --- | --- |
| Overall length of spine | H | 1.875 inches |
| Length of bristle portion | I | 1.000 inch |
| Width of bristle portion | J | 0.652 inch |

The second inner surface scarifying brush 14 also comprises a length of 0.091 inch thick (13 gauge) galvanized steel wire 112 having a center loop portion 114 through which a threaded body of the other of the screws 44 is inserted. The remainder of the wire 112 forms a twisted wire spine 116. High carbon steel wire bristles 118 are held in a distal bristle portion of the twisted wire spine 116. The twisted wire spine 116 extends through a circular opening formed in an opposite end of the handle 12 by a semicircular opening 118 (FIG. 7) in the peripheral edge 58 of the first handle piece 40 and a matching semicircular opening 120 (FIG. 8) in the peripheral edge 110 of the second handle piece 42. Suitable dimensions for the second inner surface scarifying brush 16 are as follows:

| Description | Label | Dimension |
| --- | --- | --- |
| Overall length of spine | K | 1.875 inches |
| Length of bristle portion | L | 1.000 inch |
| Width of bristle portion | M | 0.938 inch |

Figure 9:
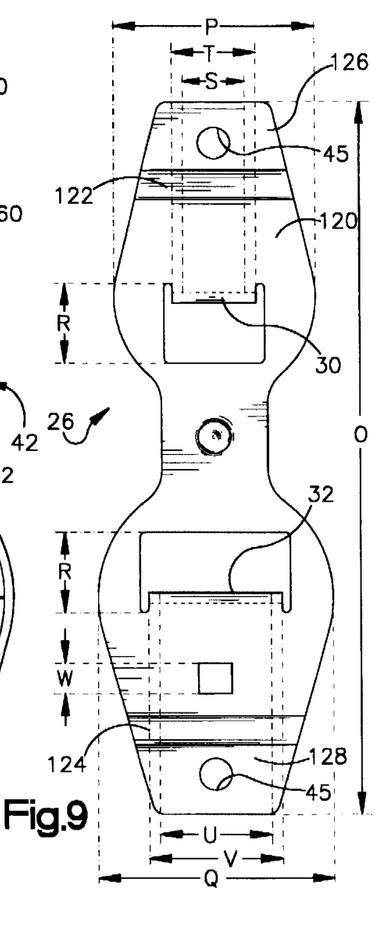
FIG. 9 is a back elevation view of the plate of the scarifying and deburring tool of FIG. 1.

As can best be seen in FIG. 9, the stainless steel plate 26 includes a central portion 120, first and second ramped portions 122, 124 and first and second end portions 126, 128. The plate 26 is affixed to the front side 28 of the handle 12 by the screws 44 which pass through respective openings 45 in the first and second end portions 126, 128. The plate openings 45 are approximately 0.205 inches in diameter. The central portion 120 of the plate 26 forms a plane that is substantially parallel to and spaced from a plane formed by the front side of the handle 12 as can best be seen in FIG. 4. Planes corresponding to the front and back sides of the handle 12 are substantially parallel and are parallel to the longitudinal axis L—L of the tool 10.

The first and second deburring scrapers 30, 32 comprise sections of the central portion 120 bent or angled at approximately right angles with respect to the remainder of the central portion. The scrapers 30, 32 are slightly tapered having widths at their distal ends which are slightly less than their respective widths adjacent the central portion 120. The tapering of the scrapers 30, 32 provides for good deburring of the inner surfaces of the end portions of the tubing sections 6, 8. As can be seen in FIG. 4, the first and scrapers 30, 32 are aligned with the first and second throughbores 22, 24 and extend through the first and second openings 72, 74 and into the first and second throughbores 22, 24 in a direction that is parallel to the throughbore axis FT and the throughbore axis ST. The first and second scrapers 30, 32 extend approximately 0.063 inch beyond the front side 28 of the handle 12.

Positioning the first deburring scraper 30 in the first throughbore 22 permits the simultaneous scarifying of the outer surface of the tubing 8 by the first outer surface scarifying brush 18 and deburring of the tubing inner surface by the tapered first scraper 30 as the tubing is rotated with respect to the tool 10. Similarly, positioning the second deburring scraper 32 in the second throughbore 24 permits the simultaneous scarifying of the outer surface of the tubing 6 by the second outer surface scarifying brush 20 and deburring of the tubing inner surface by the tapered second scraper 30 as the tubing is rotated with respect to the tool 10. Suitable dimensions for the plate 26 are as follows:

| Description | Label | Dimension |
| --- | --- | --- |
| Overall length of plate | O | 4.75 inches |
| Width of top portion of plate | P | 1.3125 inches |
| Width of bottom portion of plate | Q | 1.5625 inches |

-continued

| Description | Label | Dimension |
| --- | --- | --- |
| Openings in central portion of plate | R | 0.500 inch |
| Distal width of first scraper | S | 0.469 inch |
| Width of first scraper adjacent plate | T | 0.613 inch |
| Distal width of second scraper | U | 0.719 inch |
| Width of second scraper adjacent plate | V | 0.844 inch |
| Length of side of valve key opening | W | 0.190 inch |
| Length of scrapers (FIG. 4) | X | 0.250 inch |

While the present invention has been described with a degree of particularity, it is the intent that the invention include all modifications and alterations from the disclosed design falling within the spirit and scope of the appended claims.

The invention claim is:

1. A scarifying and deburring tool for scarifying an outer surface and scarifying and deburring an inner surface of an end portion of a cylindrically shaped member, the tool comprising:
   a) an elongated handle having an outer surface including a first side and a spaced apart second side and a first throughbore extending through an interior region of the handle, the handle further including a first opening in the first side of the handle and a second opening in the second side of the handle, the first and second openings aligned with the first throughbore;
   b) a first inner surface scarifying brush extending from the handle and adapted fit into the end portion of the cylindrically shaped member to scarify the inner surface of the cylindrically shaped member end portion;
   c) a first outer surface scarifying brush disposed in the first throughbore adapted receive the end portion of the cylindrically shaped member to scarify the outer surface of the cylindrically shaped member end portion when the end portion is inserted in the first throughbore and the member is rotated with respect to the tool;
   d) a first deburring scraper extending from a piece affixed to the outer surface of the handle and aligned with the first opening of the handle for deburring the inner surface of the cylindrically shaped member end portion simultaneously with the first outer surface scarifying brush scarifying the outer surface of the cylindrical shaped member end portion when the end portion is inserted in the first throughbore and pushed against the deburring scraper and the member is rotated with respect to the tool.

2. The scarifying and deburring tool of claim 1 wherein the outer surface scarifying brush comprises a backing strip with wire bristles extending from one side, the backing strip forming a cylinder with an open central region when seated in a portion of the handle defining the first throughbore and the wire bristles face radially inwardly forming an abrasive surface for scarifying.

3. The scarifying and deburring tool of claim 2 wherein an elastomeric strip is disposed between the backing strip of the outer surface scarifying brush and the portion of the handle defining the first throughbore.

4. The scarifying and deburring tool of claim 1 wherein the handle includes a first handle piece and a second handle piece secured to the first handle piece, the first handle piece defining the handle first side and the second handle piece defining the handle second side, the first handle piece including a first cylinder defining the first throughbore.

5. The scarifying and deburring tool of claim 1 further including a second inner surface scarifying brush which extends from an end of the handle opposite an end of the handle the first inner surface scarifying brush extends from.

6. The scarifying and deburring tool of claim 1 further including a second throughbore extending through the handle and a second outer surface scarifying brush disposed in the second throughbore and further wherein the handle includes first and second openings aligned with the second throughbore, the second outer surface scarifying brush adapted to receive an end portion of a second cylindrically shaped member having a different diameter than the end portion of the cylindrically shaped member received by the first outer surface scarifying member, the second outer surface scarifying brush scarifying an outer surface of the second cylindrically shaped member end portion when the end portion is inserted in the second throughbore and the second member is rotated with respect to the tool.

7. The scarifying and deburring tool of claim 6 further including a second deburring scraper extending from the piece affixed to the outer surface of the handle and aligned with the second throughbore for deburring an inner surface of the second cylindrically shaped member end portion simultaneously with the second outer surface scarifying brush scarifying the outer surface of the second cylindrical shaped member end portion when the end portion is inserted in the second throughbore and pushed against the second deburring scraper and the second member is rotated with respect to the tool.

8. The scarifying and deburring tool of claim 7 wherein the piece is affixed to the first side of the handle.

9. A scarifying and deburring tool for scarifying an outer surface and scarifying and deburring an inner surface of an end portion of a cylindrically shaped member, the tool comprising:
   a) an elongated handle having a first side and a spaced apart second side and a first throughbore extending through an interior region of the handle, the handle further including a first opening in the first side of the handle and a second opening in the second side of the handle, the first and second openings aligned with the throughbore;
   b) a first inner surface scarifying brush extending from the handle and adapted fit into the end portion of the cylindrically shaped member to scarify the inner surface of the cylindrically shaped member end portion;
   c) a first outer surface scarifying brush disposed in the first throughbore adapted receive the end portion of the cylindrically shaped member to scarify the outer surface of the cylindrically shaped member end portion when the end portion is inserted in the first throughbore and the member is rotated with respect to the tool;
   d) a first deburring scraper supported by the handle and aligned with the first opening of the handle for deburring the inner surface of the cylindrically shaped member end portion simultaneously with the first outer surface scarifying brush scarifying the outer surface of the cylindrical shaped member end portion when the end portion is inserted in the first throughbore and pushed against the deburring scraper and the member is rotated with respect to the tool, the first deburring scraper extending from a plate affixed to the first side of the handle.

10. The scarifying and deburring tool of claim 9 wherein a distal portion of the first deburring scraper extends into the first throughbore.

11. The scarifying and deburring tool of claim 9 wherein the plate defines a plane which is substantially parallel to a plane defined by the first side of the handle and the deburring scraper comprises a portion of the plate extending into the first throughbore at substantially a 90 degree angle with respect to the plane of the plate.

12. A scarifying and deburring tool for scarifying an outer surface and deburring an inner surface of an end portion of a cylindrically shaped member, the tool comprising:

a) an elongated handle having an exterior surface including a first side and a spaced apart second side and a throughbore extending through an interior region of the handle, the handle further including a first opening in the first side of the handle and a second opening in the second side of the handle, the first and second openings aligned with the throughbore;

b) an outer surface scarifying brush disposed in the throughbore adapted receive the end portion of the cylindrically shaped member to scarify the outer surface of the cylindrically shaped member end portion when the end portion is inserted in the throughbore and the member is rotated with respect to the tool; and c) a deburring scraper extending from a piece affixed to the outer surface of the handle and aligned with the first opening of the handle for deburring the inner surface of the cylindrically shaped member end portion simultaneously with the outer surface scarifying brush scarifying the outer surface of the cylindrical shaped member end portion when the end portion is inserted in the throughbore and pushed against the deburring scraper and the member is rotated with respect to the tool.

13. The scarifying and deburring tool of claim 12 further including an inner surface scarifying brush extending from the handle and adapted fit into the end portion of the cylindrically shaped member to scarify an inner surface of the cylindrically shaped member end portion.

* * * * *